United States Patent
Liu et al.

(10) Patent No.: US 9,398,441 B2
(45) Date of Patent: Jul. 19, 2016

(54) METHOD AND APPARATUS FOR IDENTIFYING RE-SUBSCRIBED USER

(71) Applicant: Huawei Technologies Co., Ltd., Shenzhen, Guangdong (CN)

(72) Inventors: Shikai Liu, Nanjing (CN); Guodong Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/728,470

(22) Filed: Jun. 2, 2015

(65) Prior Publication Data

US 2015/0264556 A1 Sep. 17, 2015

Related U.S. Application Data

(63) Continuation of application No. PCT/CN2012/087169, filed on Dec. 21, 2012.

(51) Int. Cl.
*H04M 3/42* (2006.01)
*H04W 8/18* (2009.01)
*H04W 24/04* (2009.01)
*H04M 15/00* (2006.01)
(Continued)

(52) U.S. Cl.
CPC ................. *H04W 8/18* (2013.01); *G06Q 30/00* (2013.01); *H04M 1/27* (2013.01); *H04M 15/58* (2013.01); *H04M 15/765* (2013.01); *H04W 24/04* (2013.01)

(58) Field of Classification Search
CPC .............................. H04M 15/41; H04M 15/43
USPC ............... 455/434, 414.1, 408, 407; 370/235; 379/126, 15.02, 114.06, 121.02, 114.1
See application file for complete search history.

(56) References Cited

U.S. PATENT DOCUMENTS

| | | | |
|---|---|---|---|
| 9,064,275 B1 * | 6/2015 | Lu .......................... | H04M 15/56 |
| 2003/0204608 A1 | 10/2003 | Isomaki | |
| 2005/0009500 A1 * | 1/2005 | Ear ....................... | H04M 15/00 455/408 |

(Continued)

FOREIGN PATENT DOCUMENTS

| | | |
|---|---|---|
| CN | 1956377 A | 5/2007 |
| CN | 1956378 A | 5/2007 |

(Continued)

OTHER PUBLICATIONS

"Part 11: Wireless LAN Medium Access Control (MAC) and Physical Layer (PHY) Specifications, IEEE Computer Society", IEEE Std 802.11-2007, Jun. 12, 2007, 1232 pages.

(Continued)

*Primary Examiner* — Kiet Doan (57) ABSTRACT

Embodiments of the present invention provide a method for identifying a re-subscribed user and a corresponding apparatus. Based on call records of a user, communication numbers of the user which meet a preset condition are identified. Then a re-subscribed user is identified by calculating a communication number coincidence rate between users within different charging periods. In accordance with the present invention, call records of users are used as a basis of comparative analysis, thereby improving an accuracy rate of identifying a re-subscribed user; a new method is practiced to sequenced communication numbers of a user and group communication records, thereby effectively reducing the number of calculations and improving calculation efficiency.

10 Claims, 7 Drawing Sheets

(51) Int. Cl.
*G06Q 30/00* (2012.01)
*H04M 1/27* (2006.01)

(56) References Cited

U.S. PATENT DOCUMENTS

| | | | |
|---|---|---|---|
| 2005/0033675 A1* | 2/2005 | Nakashima | G06Q 40/00 705/35 |
| 2006/0009214 A1 | 1/2006 | Cardina et al. | |
| 2007/0036312 A1* | 2/2007 | Cai | H04M 15/00 379/126 |
| 2009/0063315 A1* | 3/2009 | Cai | G06Q 30/0284 705/32 |
| 2009/0129386 A1 | 5/2009 | Rune | |
| 2010/0041365 A1* | 2/2010 | Lott | G06Q 30/016 455/406 |
| 2010/0234022 A1 | 9/2010 | Winterbottom | |
| 2010/0263028 A1 | 10/2010 | Zhou et al. | |
| 2012/0231781 A1 | 9/2012 | Kumar et al. | |

FOREIGN PATENT DOCUMENTS

| | | |
|---|---|---|
| CN | 101369939 A | 2/2009 |
| CN | 102215504 A | 10/2011 |
| CN | 102387512 A | 3/2012 |

OTHER PUBLICATIONS

"Part 11: Wireless LAN Medium Access Control (MAC) and Physical Layer (PHY) Specifications, Amendment 9: Interworking with External Networks, IEEE Computer Society", IEEE Std 802.11u-2011, Feb. 25, 2011, 208 pages.

\* cited by examiner

METHOD AND APPARATUS FOR IDENTIFYING RE-SUBSCRIBED USER

CROSS-REFERENCE TO RELATED APPLICATIONS

This application is a continuation of International Application No. PCT/CN2012/087169, filed on Dec. 21, 2012, which is hereby incorporated by reference in its entirety.

TECHNICAL FIELD

The present invention relates to the field of communications technologies, and specifically, to a method and an apparatus for identifying a re-subscribed user.

BACKGROUND

Mobile operators are increasing service plans and offering, and it has become increasingly common for a user to change a mobile phone number in pursuit of new service experience or with another purpose. If a user has already used a local number allocated by an operator and then buys another local number from the operator for network entry, the new number replaces the original number to use all or a part of services of the original number. Such a phenomenon is known as repeated network subscription (or known as network re-subscription) and such a user is known as a repeatedly subscribed user (re-subscribed user).

At present, a main approach to identify a re-subscribed user is to perform comparative analysis on an IMEI (International Mobile Equipment Identity, international mobile equipment identity) of a mobile phone of a new subscribed user and an IMEI of a mobile phone of an original user. If the IMEI of the mobile phone of the new subscribed user is the same as the IMEI of the mobile phone of the original user, it may be inferred that the two users are a same re-subscribed user. It is not difficult to see that this identification method is based on a prerequisite that a user uses a same mobile phone before and after network re-entry. However, this prerequisite is not true in many cases because more users opt to change their mobile phones instead of mobile numbers. For example, a user uses a new mobile phone after network re-entry, or directly cancels subscription and transfers a mobile phone of the user to another person. All exert an influence on correctness of an identification result.

On the whole, an accuracy rate and a recall rate of an analysis result obtained by using this prior-art method are not high.

SUMMARY

Embodiments of the present invention provide a method and apparatus for identifying a re-subscribed user, to solve a problem in the prior art in which an accuracy rate of identifying a re-subscribed user is not high.

According to a first aspect, an embodiment of the present invention provides a method for identifying a re-subscribed user, including:

performing statistical analysis to generate a communication record for each user within a first charging period, where each communication record records communication numbers of an individual user within the first charging period which are sequenced according to a preset rule;

performing statistical analysis to generate a communication record or each new user who is within a second charging period but not within the first charging period, where each communication record records communication numbers of an individual user within the second charging period which are sequenced according to the preset rule;

collecting communication numbers in all communication records generated by means of statistical analysis to form a group number set, and for each group number in the set, searching for at least one communication record that contains the group number among all communication records generated by means of statistical analysis, so as to generate a communication record group corresponding to the group number;

for each communication record group that is generated, executing the following steps:

identifying each communication record in the group, using the communication record as a to-be-compared communication record, and calculating a coincidence rate between communication numbers in the to-be-compared communication record and communication numbers in each communication record which is within the communication record group and meets a preset condition, where the communication record meeting a preset condition belongs to a different charging period than the to-be-compared communication record, and according to the forgoing preset rule, a group number corresponding to the communication record group is ranked first among communication numbers that are contained in both the communication record meeting a preset condition and the to-be-compared communication record; and for each calculated coincidence rate, when the coincidence rate is greater than a preset threshold, concluding that users to which two communication records corresponding to the coincidence rate belong are a same re-subscribed user.

In a first possible implementation of the first aspect, there is an interval of one or more charging periods between the second charging period and the first charging period.

In a second possible implementation of the first aspect, the performing statistical analysis to generate a communication record of the user includes:

identifying a call record of the user, where the call record contains a user number of the user and at least one peer-end number;

filtering an invalid call record;

calculating an exponent of communication between each peer-end number in an after-filtering call record and the user number; and identifying a peer-end number whose exponent of communication is greater than a predefined threshold and using the peer-end number as a communication number of the user, so as to generate a communication record of the user.

With reference to the second possible implementation of the first aspect, in a third possible implementation, the filtering an invalid call record includes at least one of the following steps:

deleting a call record in which a length of the user number or a length of a peer-end number is not in conformity with the preset number of digits in a valid number; and deleting a call record in which the user number or a peer-end number is a service phone number.

According to a second aspect, an embodiment of the present invention provides an apparatus for identifying a re-subscribed user, including:

a statistics module, a grouping module, and a calculating module, where:

the statistics module is configured to: perform statistical analysis to generate a communication record for each user within a first charging period, where each communication record records communication numbers of an individual user within the first charging period which are sequenced according to a preset rule;

the statistics module is further configured to: perform statistical analysis to generate a communication record for each new user who is within a second charging period but not within the first charging period, where each communication record records communication numbers of an individual user within the second charging period which are sequenced according to the preset rule;

the grouping module is configured to collect communication numbers in all communication records generated by means of statistical analysis to form a group number set, and for each group number in the set, search for at least one communication record that contains the group number among all communication records generated by means of statistical analysis, so as to generate a communication record group corresponding to the group number; and the calculating module is configured to: for each communication record group generated by the grouping module, execute the following steps:

identifying each communication record in the group, using the communication record as a to-be-compared communication record, and calculating a coincidence rate between communication numbers in the to-be-compared communication record and communication numbers in each communication record which is within the communication record group and meets a preset condition, where the communication record meeting a preset condition belongs to a different charging period than the to-be-compared communication record, and according to the forgoing preset rule, a group number corresponding to the communication record group is ranked first among communication numbers that are contained in both the communication record meeting a preset condition and the to-be-compared communication record; and for each calculated coincidence rate, when the coincidence rate is greater than a preset threshold, concluding that users to which two communication records corresponding to the coincidence rate belong are a same re-subscribed user.

In a first possible implementation of the second aspect, the performing, by the statistics module, statistical analysis to generate a communication record of the user includes:

identifying a call record of the user, where the call record contains a user number of the user and at least one peer-end number;

filtering an invalid call record;

calculating an exponent of communication between each peer-end number in an after-filtering call record and the user number; and identifying a peer-end number whose exponent of communication is greater than a predefined threshold and using the peer-end number as a communication number of the user, so as to generate a communication record of the user.

With reference to the second aspect or the first possible implementation of the second aspect, in a second possible implementation of the second aspect, there is an interval of one or more charging periods between the second charging period and the first charging period.

By using the method and apparatus for identifying a re-subscribed user in the embodiments of the present invention, a re-subscribed user is identified by means of comparative analysis on communication numbers of users within different charging periods, which can greatly improve identifying accuracy. In addition, communication records of users are grouped according to communication numbers in the communication records, and then a communication number coincidence rate between users is calculated within each group, which can effectively reduce the number of invalid comparisons.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To solve the prior art problem of low accuracy in identifying a re-subscribed user, an embodiment of the present invention provides a method for identifying a re-subscribed user, which can improve the accuracy rate of identifying a re-subscribed user.

The following first describes an application environment of the embodiments of the present invention.

Figure 1:
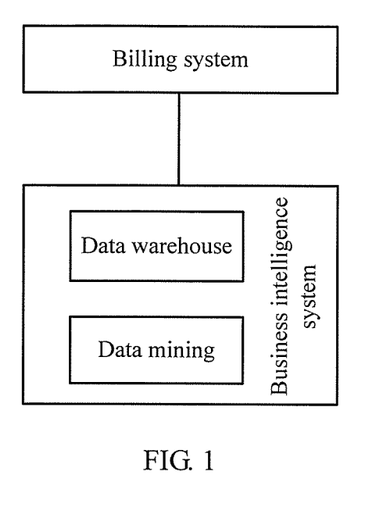
FIG. 1 is a schematic diagram of an application environment of a method for identifying a re-subscribed user according to an embodiment of the present invention.

FIG. 1 is a schematic diagram of an application environment of a method for identifying a re-subscribed user according to an embodiment of the present invention. An application environment of the technical solutions of the present invention is mainly comprised of two parts: a billing (Billing) system and a business intelligence (Business Intelligence, BI) system. The billing system is a core of a telecommunication support system, and mainly implements functions such as collecting, pre-processing, rating, and charging of telecommunication services. The business intelligence system is a system that performs data analysis by using advanced data warehouse technology, on-line analytical processing technology, data mining, and a data presentation technology. As shown in FIG. 1, a typical business intelligence system may be comprised of the following two parts:

data warehouse (Data Warehouse, DW): integrates data distributed in different places and stores the integrated data in a database, which facilitates data access for a user and is also favorable for a user to perform comprehensive analysis on historical data within a period of time; and data mining (Data Mining, DM): analyzes integrated mass data according to a determined service objective, outputs an analysis result, and further models the analysis result, so as to discover data regularity.

Figure 2:
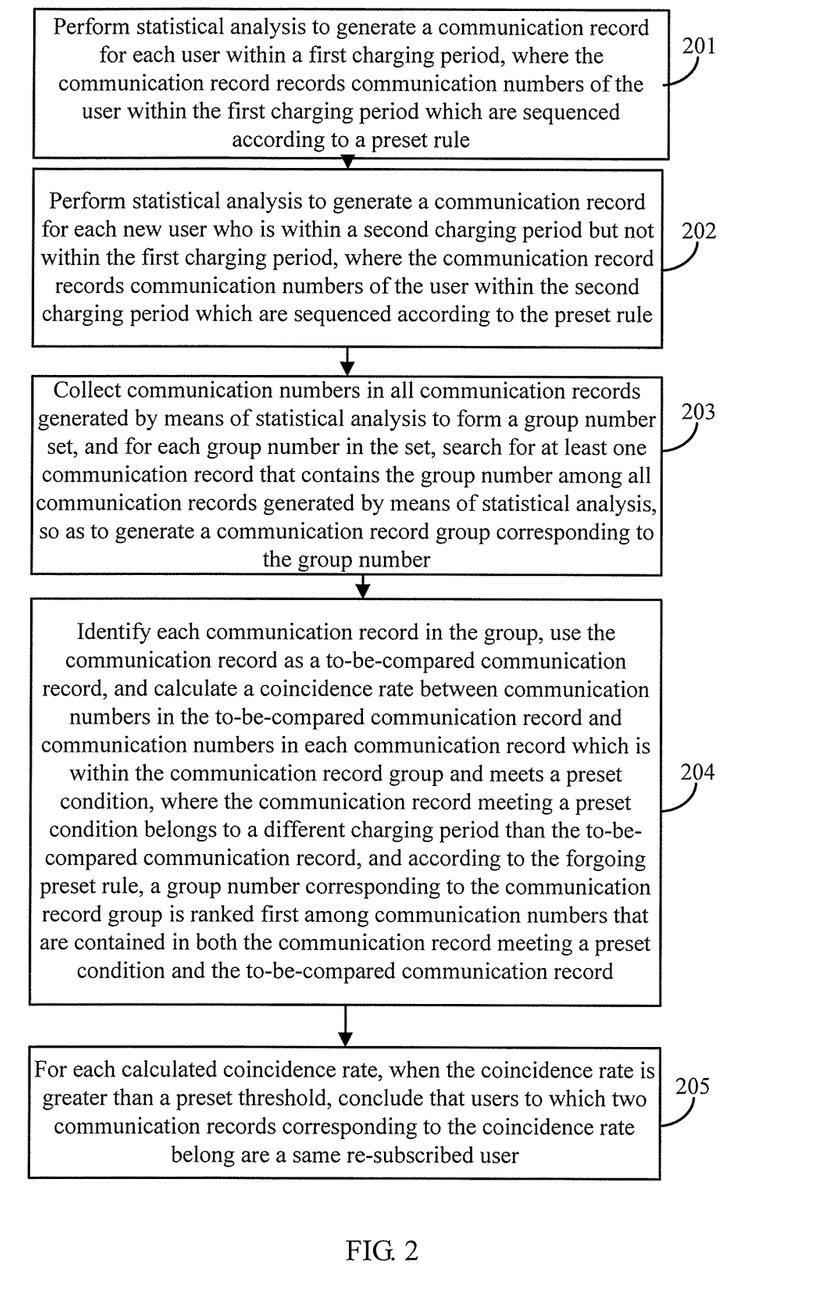
FIG. 2 is a schematic diagram of a method for identifying a re-subscribed user according to an embodiment of the present invention.

FIG. 2 is a schematic diagram of a method for identifying a re-subscribed user according to an embodiment of the present invention. The following steps of the method are described in detail according to this figure:

Step 201: Perform statistical analysis to generate a communication record for each user within a first charging period, where each communication record records communication numbers of an individual user within the first charging period which are sequenced according to a preset rule.

A communication number is a number whose call with a user within one charging period meets a preset condition. Detailed processes of identifying a communication number will be disclosed in a subsequent embodiment.

Step 202: Perform statistical analysis to generate a communication record for each new user who is within a second charging period but not within the first charging period, where each communication record records communication numbers of an individual user within the second charging period which are sequenced according to a same preset rule.

The preset rule may be to sequence communication numbers in descending order of their numeral values, or may also be to sequence them in ascending order of numeral values, which is not limited in the embodiments of the present invention. The preset sequencing rules used in step 201 and step 202 are the same.

A length of a charging period may be specified by a mobile operator according to an actual need, which is not limited in the embodiments of the present invention. For ease of description, the following uses a calendar month as a charging period to disclose the technical solutions provided in the embodiments of the present invention.

Chronologically, the second charging period may be any charging period after the first charging period. Optionally, it is required that an interval of one charging period exist between the second charging period and the first charging period. This requirement is largely driven by the fact that most users who change their phone numbers use both an original number and a new number during a transition period (a month in which a user changes a number is seen as a transition period, only an original number is used before the transition period, and only a new number is used after the transition period). Further, an interval of more than one charging period may also exist between the second charging period and the first charging period.

In this embodiment of the present invention, statistics is performed on communication records of all users within the first charging period. Among users within the second charging period, only a new user who is within the first charging period may be a re-subscribed user, and therefore it is only required to perform statistical analysis to generate a communication record of each new user who is within the second charging period but not within the first charging period.

Step 203: Collect communication numbers in all communication records generated by means of statistical analysis to form a group number set, and for each group number in the set, search for at least one communication record that contains the group number among all communication records generated by means of statistical analysis, so as to generate a communication record group corresponding to the group number.

A detailed step of grouping communication records will be described in a subsequent embodiment.

For each communication record group that is generated, the following steps are executed:

Step 204: Identify each communication record in the group, use the communication record as a to-be-compared communication record, and calculate a coincidence rate between communication numbers in the to-be-compared communication record and communication numbers in each communication record which is within the communication record group and meets a preset condition, where the communication record meeting a preset condition belongs to a different charging period than the to-be-compared communication record, and according to the forgoing preset rule, a group number corresponding to the communication record group is ranked first among communication numbers that are contained in both the communication record meeting a preset condition and the to-be-compared communication record.

Details of the step will be disclosed in a subsequent embodiment.

Step 205: For each calculated coincidence rate, when the coincidence rate is greater than a preset threshold, conclude that users to which two communication records corresponding to the coincidence rate belong are a same re-subscribed user.

In the foregoing steps 204 and 205, communication number coincidence rates between users in communication record groups may also be calculated concurrently on multiple servers.

According to the method for identifying a re-subscribed user in this embodiment, a re-subscribed user is identified by means of comparative analysis on communication numbers of a user within different charging periods, which can greatly improve identifying accuracy. In addition, communication records of users are grouped according to communication numbers in the communication records, and then a communication number coincidence rate between users is calculated within each group, which can effectively reduce the number of invalid comparisons. It is assumed that the number of users in the first charging period is M and the number of newly added users in the second charging period is N. According to the prior art, M*N operations need to be performed to complete such a comparison. However, by using the method provided in this embodiment of the present invention, the number of calculations may be decreased to $(M+N)*k^2$ and is far less than the number of calculations in the prior art (where k is the number of communication numbers of a single user, and k is far less than M).

The foregoing method for identifying a re-subscribed user may be roughly divided into two steps. Step 1: identify communication numbers of a user within a first charging period, and communication numbers of a new user who is within a second charging period but not within the first charging period. Step 2: calculate a coincidence rate between the communication numbers of the user in the first charging period and the communication numbers of the new user in the second charging period, and identify a re-subscribed user according to a value of the coincidence rate.

For ease of description, a user within a first charging period is hereinafter referred to as an original user and a user who is within a second charging period but not within the first charging period is hereinafter referred to as a new user. A user and a user number are interchangeable in this embodiment of the present invention.

Figure 3:
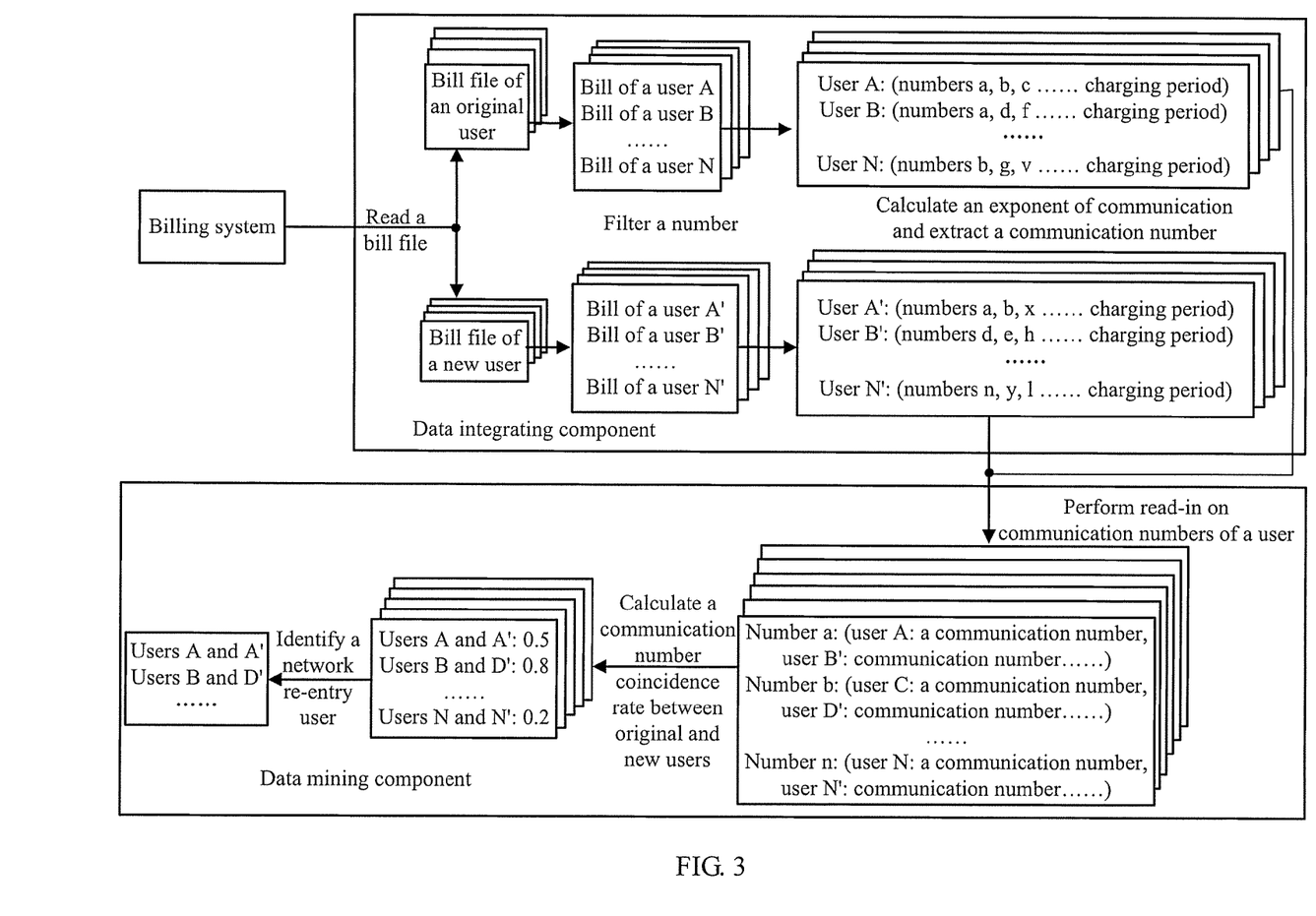
FIG. 3 is a schematic diagram of a system for identifying a re-subscribed user according to an embodiment of the present invention.

FIG. 3 is a schematic diagram of a system for identifying a re-subscribed user according to one embodiment of the present invention. The system is comprised of three parts: a billing system, a data integrating component, and a data mining component. The data integrating component and the data mining component may be integrated into a business intelligent system, or may also be deployed as a separate apparatus.

The data integrating component is separately connected to the billing system and the data mining component, and is configured to execute step 1 in the aforementioned solution of identifying a re-subscribed user. Specifically, the data integrating component reads, from the billing system, a bill file of an original user in a first charging period (for example, January 2011) and a bill file of a new user in a second charging period (for example, March 2011); according to information in the bill files, groups the bill files and concurrently calculates an exponent of communication between the original user and each peer-end number and an exponent of communication between the new user and each peer-end number; and identifies peer-end numbers whose exponent of communication is greater than a predefined threshold as communication numbers of the original and new users. Steps for calculating an exponent of communication and identifying a communication number will be described in detail in a subsequent embodiment.

A user refers to a person who applies for a number from a mobile operator and accepts service provided by the operator. In this embodiment of the present invention, a mobile number is used to refer to a user. A re-subscribed user is identified according to a value of a communication number coincidence rate between original and new users.

The data mining component is connected to the data integrating component, and is configured to execute step 2 in the aforementioned solution of identifying a re-subscribed user. Specifically, the data mining component reads the communication numbers of the original and new users from the data integrating component; groups data of these communication numbers; and then concurrently calculates a communication number coincidence rate between the original and new users on multiple servers, and identifies a re-subscribed user according to a value of the coincidence rate. Grouping and calculation of a communication number coincidence rate will be described in detail in a subsequent embodiment.

The following describes in detail the two steps in the solution for identifying a re-subscribed user in this embodiment of the present invention.

Step 1: Identify communication numbers of an original user in a first charging period and communication numbers of a new user in a second charging period.

Figure 4:
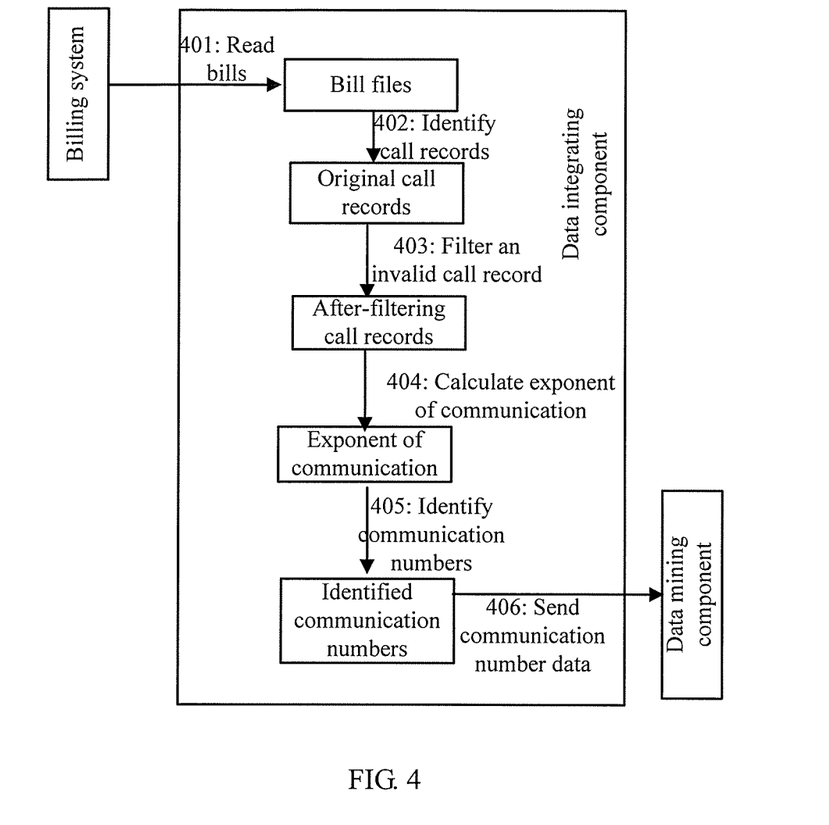
FIG. 4 is a flowchart of calculating communication numbers of original and new users according to an embodiment of the present invention.

FIG. 4 is a flowchart of calculating communication numbers of original and new users according to an embodiment of the present invention. A step for calculating communication numbers of an original user is described in detail according to this figure. A process of calculating communication numbers of a new user is the same as the step for calculating communication numbers of an original user, and details are not described herein again.

Step 401: A data integrating component reads bills from a billing system (Billing).

Specifically, the data integrating component reads bills of all users in a first charging period from the billing system.

Step 402: The data integrating component identifies call records from the bills.

The identified call records include a user number, at least one peer-end number that has a call with the user number, date of each call, and duration of each call. If January 2011 is the first charging period, the identified call records may be shown in the following Table 1.

A user number and a peer-end number in Table 1 are replaced by letters.

TABLE 1

| User Number | Peer-end Number | Call Date | Call Duration (Unit: Second) |
|---|---|---|---|
| A | H | 2011 Jan. 1 | 180 |
| A | H | 2011 Jan. 4 | 200 |
| A | H | 2011 Jan. 6 | 240 |
| A | H | 2011 Jan. 8 | 330 |
| A | H | 2011 Jan. 10 | 250 |
| A | I | 2011 Jan. 2 | 250 |
| A | I | 2011 Jan. 16 | 180 |
| A | I | 2011 Jan. 28 | 270 |
| A | I | 2011 Jan. 30 | 100 |
| A | J | 2011 Jan. 5 | 160 |
| A | J | 2011 Jan. 12 | 260 |
| A | J | 2011 Jan. 26 | 150 |
| B | H | 2011 Jan. 15 | 60 |
| B | L | 2011 Jan. 18 | 80 |
| ... | ... | ... | ... |

Step 403: The data integrating component filters out an invalid call record.

In step 402, the call records identified by the data integrating component include all call records of all users in January 2011, and an amount of data is very huge. If all the data is used for a subsequent operation, lots of resources are occupied, thereby causing very large burden to a server. In this embodiment of the present invention, some of the call records may be deleted, in consideration of factors such as conserving calculation resources and improving calculation accuracy. For example, call records between a user and an operator's customer service center are filtered out, because all users served by a same operator carry out communication with a customer service center of the operator in some way, and if these call records are used to perform calculation, accuracy of identifying a re-subscribed user is affected. For another example, call records generated when a user dials some hotline numbers or common service phone numbers are filtered out, because these calls are random and can be all ignored when identifying a re-subscribed user. In addition, an operator has some enterprise users or institution users who provide common service. These users are usually not re-subscribed users and the operator takes a record even if these users change a number. Therefore, there is no need to consider these users when identifying a re-subscribed user, and call records generated by these users also need to be filtered out.

In this embodiment of the present invention, the foregoing call records that can be deleted are called invalid call records. Before a subsequent operation is performed, these invalid call records need to be filtered out.

An invalid call record refers to a call record that contains an invalid user number or peer-end number. That is, a call record is an invalid call record if either a user number or a peer-end number included in the call record is invalid. Therefore, the foregoing invalid call records may be filtered out according to a user number or a peer-end number.

The filtering an invalid call record should include at least one of the following two steps:

Step 431: Delete a call record in which a length of a user number or a length of a peer-end number is not in conformity with the preset number of digits in a valid number.

In this embodiment of the present invention, numbers consisting of 7 digits, 8 digits, 10 digits, 11 digits, and 12 digits are set as valid numbers; and other numbers are invalid numbers. For example, a customer service number 10086 of China Mobile is an invalid number that does not meet the preset length requirement. A call record that contains this number is an invalid call record and is deleted in this step.

Step 432: Delete a call record in which a user number or a peer-end number is a service phone number.

Service phone numbers include phone numbers that some companies or public agencies use to provide service, for example, hotline numbers and common service numbers.

After the filtering performed in step 431, some service numbers whose length is in conformity with the foregoing set length of a valid number are not deleted, for example, numbers beginning with 400 and 800 consist of 10 digits but they belong to specific service numbers. A call record containing this type of numbers also needs to be deleted. When this step is implemented, filtering may be performed according to a presetting. Known service numbers are preset by an operator and filtered out in this step. This can not only improve accuracy of an identification result but also conserve server resources.

It should be noted that, in consideration of factors such as calculation accuracy or calculation resource occupation, anyone or both of the foregoing two steps may be executed. Moreover, a sequence of executing these two steps does not need to be limited to the foregoing sequence. Step 432 may also be executed prior to step 431. This embodiment of the present invention is not limited thereto.

In one embodiment of the present invention, the data integrating component further groups after-filtering call records and adds call records with a same user number to one group. All groups of data are mutually independent. An operation on one group of data does not affect data of another group. Based on such grouping, all groups of data may be calculated concurrently on different servers, thereby improving calculation efficiency and lowering a requirement for a single server. For example, for data shown in the foregoing Table 1, records of the user number A may be used as one group and operated on one server, and multiple records of the user number B may be used as one group and operated on another server. Operations on the two groups of data are not affected by each other. The following describes subsequent steps by using call records of the user number A as an example.

Step 404: The data integrating component calculates an exponent of communication between each peer-end number in an after-filtering call record and a user number.

The so-called exponent of communication is a quantitative indicator which measure a degree of communication between one peer-end number and a user number. Specifically, based on the after-filtering call records in the foregoing step 403, the data integrating component calculates an exponent of communication between each peer-end number of a user and a user number of the user in January 2011.

Before the calculation, call records that contain a same user number and a same peer-end number are first summarized. Summarized data includes duration, quantity, and call date distribution of calls between the user number and the peer-end number in January 2011.

The following Table 2 shows an example of summarized data, the user number in this example is the user number A. The call date distribution indicates a date of each call that is obtained by means of statistical analysis. A numeral before a colon indicates a statistical period (generally one calendar month); and numerals which are behind the colon and separated by commas indicate specific dates of calls.

TABLE 2

| User Number | Peer-end Number | Call Duration (Unit: Second) | Number of Calls | Call Date Distribution |
|---|---|---|---|---|
| A | H | 1200 | 5 | {201101: 1, 4, 6, 8, 10} |
| A | I | 700 | 4 | {201101: 2, 16, 28, 30} |
| A | J | 570 | 3 | {201101: 5, 12, 26} |

The following describes a method for calculating an exponent of communication.

Specifically, one embodiment of the present invention provides the following formula to calculate an exponent of communication between a peer-end number and a user number:

exponent of communication exp=$x$*(call frequency−minimum call frequency)/(maximum call frequency−minimum call frequency)+$y$*(call duration−minimum call duration)/(maximum call duration−minimum call duration)+$z$*(number of calls−minimum number of calls)/(maximum number of calls−minimum number of calls)

The call frequency refers to the frequency of calls between a user number and a peer-end number of the user number over a period of time (generally in a unit of month). By means of calculation, the maximum call frequency and the minimum call frequency in the foregoing formula are selected from obtained frequencies of calls between all peer-end numbers and the user number. Like the maximum/minimum call frequency, the maximum/minimum call duration and the maximum/minimum number of calls also need to be obtained by comparing corresponding data of all peer-end numbers.

x, y, and z are weights of the call frequency, the call duration, and the number of calls in the exponent of communication. The call frequency occupies a primary weight, and the call duration and the number of calls occupy a secondary weight. Specific values may be determined by operators by means of testing.

The foregoing Table 2 is used as an example. Among three peer-end numbers H, I, and J of the user number A, the minimum call duration is 570 seconds, the maximum call duration is 1200 seconds, the minimum number of calls is 3, and the maximum number of calls is 5. A value of call frequency needs to be obtained by means of calculation according to Table 2, and then the maximum call frequency and the minimum call frequency are further obtained.

The following first describes a method for calculating call frequency.

In this embodiment of the present invention, the numbers of days, weeks, and 10-day periods during which a peer-end number appears are all taken into consideration. This can rule out some call numbers that have few call behavior with a user number and improve accuracy in calculating call frequency. Based on the foregoing consideration, the following provides a formula for calculating call frequency:

Freq=($D_n/C+W_n/W+P_n/P$)

C is a constant and indicates the number of statistical days for calculating call frequency, and is generally the number of days in a month.

Dn indicates the number of days during which a peer-end number has a call behavior with a user number within C days.

W indicates the number of weeks within C days. During calculation, the number of statistical days is divided by 7. If there is a remainder after the number of statistical days is divided by 7, an integer part of a result is taken and then increased by 1.

Wn indicates the number of weeks during which a peer-end number has a call behavior with a user number within C days. During calculation, the number of weeks during which a call behavior occurs is obtained according to a specific date when a call occurs.

P indicates the number of 10-day periods included within C days. During calculation, the number of statistical days is divided by 10 and an integer part of a result is taken.

Pn indicates the number of 10-day periods during which a peer-end number has a call behavior with a user number within C days. During calculation, the number of weeks during which a call behavior occurs is obtained according to a specific date when a call occurs.

Based on the data in the foregoing Table 2, frequency of calls between each peer-end number and the user number A is calculated according to the formula as follows:

$$\text{Freq}H = 5/31 + 3/5 + 1/3 = 1.06$$

$$\text{Freq}I = 4/31 + 4/5 + 3/3 = 1.93$$

$$\text{Freq}J = 3/31 + 3/5 + 3/3 = 1.70$$

In addition, it can be seen that the minimum call frequency is 1.06 and the maximum call frequency is 1.93. After the call frequency is calculated, an exponent of communication can be calculated with additional reference to the data in Table 2. According to the formula for calculating an exponent of communication, where values of x, y, and z are 0.4, 0.3, and 0.3 respectively, the exponent of communication between each peer call number and the user number A is calculated as follows:

exponent of communication between the peer-end number H and the user number A: expH=
0.4(1.06−1.06)/(1.93−1.06)+0.3(1200−570)/(1200−570)+0.3(5−3)/(5−3)=0.60;

exponent of communication between the peer-end number I and the user number A: expI=
0.4(1.93−1.06)/(1.93−1.06)+0.3(700−570)/(1200−570)+0.3 (4−3)/(5−3)=0.62;

exponent of communication between the peer-end number J and the user number A: expJ=
0.4 (1.70−1.06)/(1.93−1.06)+0.3(570−570)/(1200−570)+0.3 (3−3)/(5−3)=0.29

Further, the data integrating component can obtain, by means of calculation, exponents of communication between all user numbers and their peer-end numbers in January 2011.

In one embodiment of the present invention, the foregoing exponents of communication between a user number and all peer-end numbers in each group can be concurrently calculated on multiple servers. An input to the grouping is the after-filtering call records obtained in step 403. Based on such grouping, all groups of data may be calculated concurrently on different servers, thereby improving calculation efficiency and lowering a requirement for a single server.

Step 405: The data integrating component identifies a communication number and sequence the communication number according to a preset rule.

Specifically, the data integrating component may identify a peer-end number whose exponent of communication is greater than a predefined threshold, and uses the peer-end number as a communication number of the user number A. For example, the predefined threshold for exponent of communication is 0.25. According to the calculated exponents of communication which are listed in step 404, a peer-end number whose exponent of communication is greater than 0.25 is selected as a communication number of the user number A. Output data is shown in the following Table 3, where a user number and a communication number are replaced by letters. In this embodiment of the present invention, data including a user number, a communication number, and a charging period may be known as a communication record of a user.

TABLE 3

| User Number | Communication Number | Charging Period |
| --- | --- | --- |
| A | H, I, J | 201101 |

Further, the data integrating component may obtain communication records of all users in January 2011 by means of consolidation.

Consolidated communication records of original and new users may be shown in the following Table 4. In step 2, a communication number coincidence rate between the original and new users is calculated according to the data in Table 4.

TABLE 4

| User Number | Communication Number | Charging Period |
| --- | --- | --- |
| A | H, I, J | 201101 |
| B | H, L, M | 201101 |
| C | L, M, O | 201101 |
| D | P, Q | 201101 |
| X | H, I, J | 201103 |
| Y | H, L, M | 201103 |
| Z | L, M, O | 201103 |
|   |   | 201103 |

Specially, to facilitate calculation of a communication number coincidence rate in step 2, the data integrating component further sequences communication numbers of each user according to the preset rule, for example, according to numeral values of the communication numbers. Specifically, sequencing may be performed in ascending order or in descending order, which is not limited in this embodiment of the present invention. A purpose of performing sorting will be described in detailed in an embodiment that discloses step 2.

Step 406: The data integrating component sends communication numbers shown in the foregoing Table 4 to a data mining component, so that the data mining component calculates a communication number coincidence rate.

After the data integrating component completes step 1, the data mining component executes step 2 to calculate a communication number coincidence rate between the original and new users, and identifying a re-subscribed user according to a value of the obtained coincidence rate.

To improve efficiency, an embodiment of the present invention puts forward a method of grouping and concurrent computation to execute step 2. After receiving the communication records of the original and new users, the data mining component first groups these records and then concurrently processes data within each group, so as to calculate a communication number coincidence rate between the original and new users and further identify a re-subscribed user according to a value of the coincidence rate.

The following first describes a data grouping method provided in one embodiment of the present invention, which is also a detailed description of the aforementioned step 203.

In this embodiment of the present invention, communication numbers in the communication records of the original and new users are collected and the communication numbers are used as group numbers. For each group number, a communication record that contains the group number is searched for among the communication records of the original and new users to generate a communication record group corresponding to the group number. The number of groups into which the communication records of the original and new users are divided depends on the number of different communication numbers contained in the communication records of the original and new users.

Specifically, the foregoing grouping is implemented by using the following two steps:

Step 1: Introduce a modeling idea in a graph theory (Graph Theory) to use a graph in the graph theory to represent a communication record of a user. A user number and a communication number are represented as a vertex (vertex) of the graph separately. A vertex representing the user number is connected to a vertex representing the communication number by using an edge (edge). A charging period to which the communication record belongs is represented as a property (property) on the edge.

Figure 5:
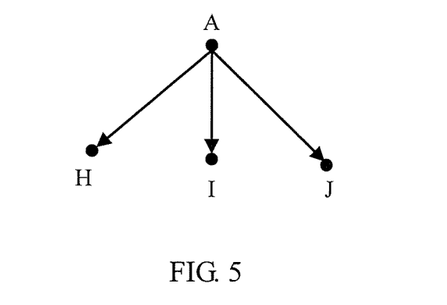
FIG. 5 is a diagram showing a communication record of a user A in January 2011 according to an embodiment of the present invention.

FIG. 5 shows a graph representing a communication record of the user A in January 2011. The user number A and its communication numbers H, I, and J are represented as a vertex of the graph separately. A is separately connected to H, I, and J. The charging period January 2011 is represented as a property on an edge.

Step 2: Add the communication records of the original users and new users to a vertex of each communication number contained in the communication records. The user A is still used as an example.

Figure 6:
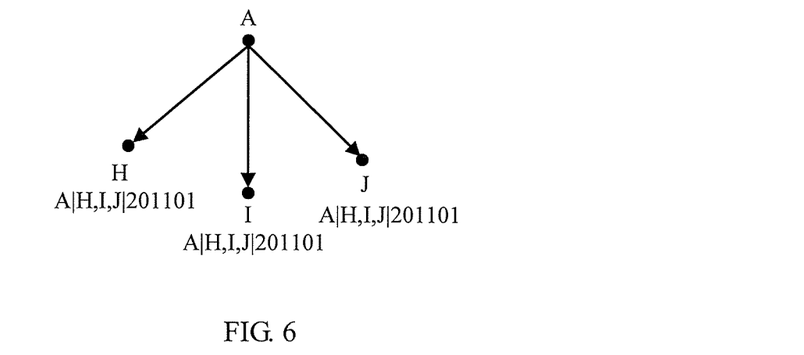
FIG. 6 is a diagram obtained after a converted communication record is added to a vertex of each communication number of a user A according to an embodiment of the present invention.

The record A|H,I,J|201101 is added to three vertexes respectively representing three communication numbers H, I, and J of the user A. Three records are obtained: H<A|H,I,J|201101>, I<A|H,I,J|201101>, and J<A|H,I,J|201101>. A graph after a communication record is added is shown in FIG. 6. For the sake of intuitive display, a communication record of a user is represented in a format of "user number|communication number|charging period".

Figure 7:
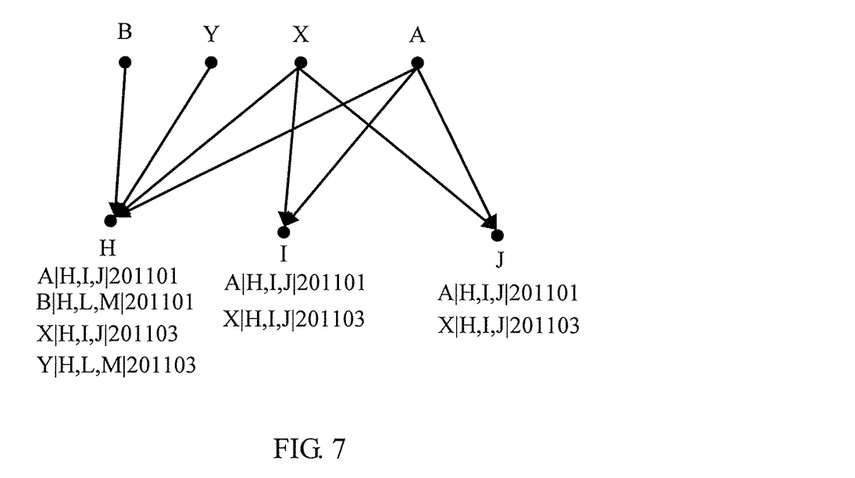
FIG. 7 is a diagram obtained after a communication record of four users A, B, X, and Y is added according to an embodiment of the present invention.

Further, four users A, B, X, and Y are used as an example, and a graph after communication records are added is shown in FIG. 7. It can be seen from FIG. 7 that at the vertex representing the number H, records of the four users A, B, X, and Y are added: H<A|H,I,J|201101>, H<B|H,L,M|201101>, H<X|H,I,J|201103>, H<Y|H,L,M|201103>; at the vertex representing the number I, records of two users A and X are added: I<A|H,I,J|201101> and I<X|H,I,J|201103>; and at the vertex representing the number J, records of users A and X are added: J<A|H,I,J|201101> and J<X|H,I,J|201103>.

It can be clearly seen from FIG. 7 that after the foregoing two steps, communication records that contain a same communication number are added to one group, which provides a basis for subsequent concurrent calculation.

In this embodiment, a modeling idea in a graph theory is introduced. Mass data is represented with the aid of a simple graph, and an originally complex grouping operation can be completed simply by using two simple steps "modeling-adding". Moreover, after such grouping processing, when a communication number coincidence rate is being calculated, there is no need to compare new numbers with original numbers one by one, and it is only required to compare data which is added at a vertex of a same communication number but belongs to different charging periods. This can effectively reduce the number of invalid comparisons and conserve calculation resources. Referring to FIG. 7, a communication number coincidence rate is separately calculated at vertexes representing communication numbers such as H, I, and J. A higher coincidence rate indicates a higher possibility that a new user is a re-subscribed user. Data at various vertexes is mutually independent and may also be concurrently calculated on different servers, which can improve calculation efficiency and lower a requirement for a single server.

When communication number coincidence rates between original and new users are concurrently calculated on different servers, the calculation process is substantially the same, and a difference only lies in that processed data is different. The following describes a method for calculating a communication number coincidence rate between original and new users by using a group of data that contains the communication number H as an example.

A communication number coincidence rate between original and new users is calculated according to the aforementioned step 204 as follows: identify each communication record in the group, use the communication record as a to-be-compared communication record, and calculate a coincidence rate between communication numbers in the to-be-compared communication record and communication numbers in each communication record which is within the communication record group and meets a preset condition, where the communication record meeting a preset condition belongs to a different charging period than the to-be-compared communication record, and according to the forgoing preset rule, a group number corresponding to the communication record group is ranked first among communication numbers that are contained in both the communication record meeting a preset condition and the to-be-compared communication record.

It can be seen that, in this step, comparison is not performed on every two of all communication records in a group, and two communication records to be compared need to meet the following two conditions:

1. Two communication records belong to different charging periods.

In this embodiment of the present invention, a re-subscribed user is identified based on comparison of user communication records in different charging periods.

2. According to the aforementioned preset rule, a group number corresponding to the communication record group is ranked first among communication numbers that are contained in the both communication records.

A main reason for introducing the second restrictive condition is that a communication record of each user is added to all communication numbers of the user during grouping, and in this way, many duplicate records are added within different communication record groups. For example, as shown in FIG. 7, two records A|H,I,J|201101 and X|H,I,J|201103 are at each of vertexes representing communication numbers H and I. If all communication records within each group are compared, the records A|H,I,J|201101 and X|H,I,J|201103 are compared within both a group formed by the communication number H and a group formed by the communication number I, thereby causing unnecessary repeated calculations. Considering a huge amount of data, it is necessary to perform filtering before calculation.

For example, referring to FIG. 7, communication records A|H,I,J|201101 and X|H,I,J|201103 exist within a group corresponding to the communication number H. The number H is ranked first among communication numbers that are contained in the both communication records and happens to be the group number H of the group. Therefore, the two communication records meet the aforementioned second condition, and a communication number coincidence rate between the two communication records is calculated. Although the same two communication records A|H,I,J|201101 and X|H,I,J|201103 exist within a group corresponding to the communication number I, the two communication records do not meet the second condition because the communication number ranked first within the group is the communication number H instead of the group number I. Therefore, subsequent calculation is not performed.

Based on this example, it can be more clearly seen that a same communication record within different groups is not repeatedly calculated, thereby avoiding a waste of resources.

Figure 8:
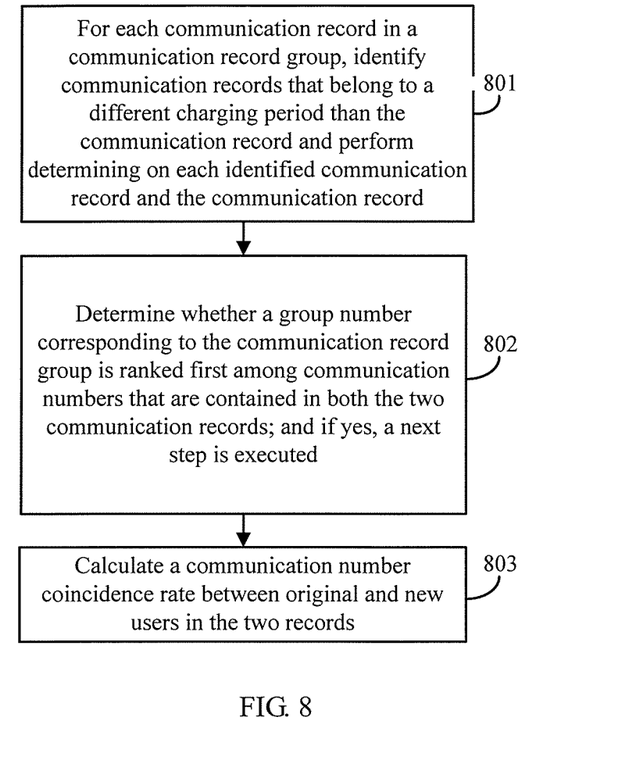
FIG. 8 is a flowchart of calculating a communication number coincidence rate of original and new users according to an embodiment of the present invention.

FIG. 8 is a flowchart of calculating a communication number coincidence rate between original and new users, which further describes the step 204. The following steps shown in the figure are described in detail:

Step 801: For each communication record in a communication record group, identify communication records that belong to a different charging period than the communication record and perform determining on each identified communication record and the communication record.

Step 802: Determine whether a group number corresponding to the communication record group is ranked first among communication numbers that are contained in both the two communication records; and if yes, step 803 is executed.

If it is determined that the group number is ranked first among the communication numbers that are contained in both the two records, a communication number coincidence rate between the two records is calculated; or if it is determined that the group number is not ranked first among the communication numbers that are contained in both the two records, the two records are ignored and no calculation is performed.

The filtering performed in step 802 ensures that two same records are not repeatedly calculated; and the sequencing of communication numbers in the aforementioned step 405 ensures correctness of duplicate removal herein.

For example, referring to FIG. 7, the communication record A|H,I,J|201101 is identified from a group corresponding to the communication number H.

Step 803: Calculate a communication number coincidence rate between original and new users in the two records.

Specifically, one embodiment of the present invention provides one formula for calculating a communication number coincidence rate: number of same communication numbers/total number of communication numbers. Based on the data shown in FIG. 7, it may be calculated that a communication number coincidence rate between users A and X is 100%, a communication number coincidence rate of A and Y is 20%, a communication number coincidence rate between B and Y is 100%, and a coincidence rate between B and X is 20%.

A data integrating component further collects communication number coincidence rates calculated by each server, and selects, by means of filtering, two records whose communication number coincidence rate is greater than a predefined threshold. Respective users of the two records may be identified as a same re-subscribed user.

For example, records with the communication number coincidence rate greater than 50% may be selected by means of filtering, and users in the records are a re-subscribed user. In this embodiment of the present invention, a same formula is used to calculate each communication number coincidence rate, and then filtering is performed on calculation results. The calculation formula to be used may be diversified, and does not constitute a limitation on the embodiments of the present invention.

According to the calculation results listed in step 803, it may be concluded that X and A belong to a same re-subscribed user, and Y and B belong to a same re-subscribed user.

By using the foregoing method of step 801 through step 803 to calculate a communication number coincidence rate between original and new users, the number of calculations decreases to $(M+N)*k^2$ (where, k is the number of communication numbers of a single user, and k<M), and is far less than the number of calculations in the prior art. Moreover, by using a grouping and concurrent calculation manner, concurrent use of calculation resources on multiple servers can be flexibly achieved, thereby further reducing calculation time.

Figure 9:
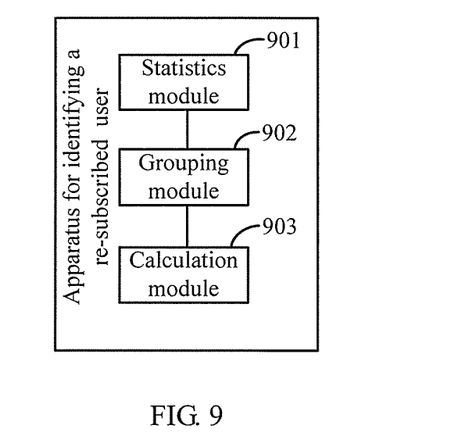
FIG. 9 is a schematic structural diagram of an apparatus for identifying a re-subscribed user according to an embodiment of the present invention.

FIG. 9 is a schematic structural diagram of an apparatus for identifying a re-subscribed user according to one embodiment of the present invention. The apparatus is configured to execute the method disclosed in the aforementioned embodiment for identifying a re-subscribed user. As shown in the figure, a statistics module 901, a grouping module 902, and a calculating module 903 are included.

The statistics module 901 is configured to: perform statistical analysis to generate a communication record for each user within a first charging period, where each communication record records communication numbers of an individual user within the first charging period which are sequenced according to a preset rule; and further configured to: perform statistical analysis to generate a communication record for each new user who is within a second charging period but not within the first charging period, where each communication record records communication numbers of an individual user within the second charging period which are sequenced according to the aforementioned preset rule.

There is an interval of one or more charging periods between the second charging period and the first charging period.

The performing, by the statistics module 901, statistical analysis to generate a communication record of the user specifically includes:

identifying a call record of the user, where the call record contains a user number of the user and at least one peer-end number;

filtering an invalid call record;

calculating an exponent of communication between each peer-end number in an after-filtering call record and the user number; and identifying a peer-end number whose calculated exponent of communication is greater than a predefined threshold and using the peer-end number as a communication number of the user, so as to generate a communication record of the user.

The grouping module 902 is configured to collect communication numbers in all communication records generated by the statistics module 901 by means of statistical analysis to form a group number set, and for each group number in the set, search for at least one communication record that contains the group number among all communication records generated by means of statistical analysis, so as to generate a communication record group corresponding to the group number.

The calculating module 903 is configured to: for each communication record group generated by the grouping module 902, execute the following steps:

identifying each communication record in the group, using the communication record as a to-be-compared communication record, and calculating a coincidence rate between communication numbers in the to-be-compared communication record and communication numbers in each communication record which is within the communication record group and meets a preset condition, where the communication record meeting a preset condition belongs to a different charging period than the to-be-compared communication record, and according to the forgoing preset rule, a group number corresponding to the communication record group is ranked first among communication numbers that are contained in both the communication record meeting a preset condition and the to-be-compared communication record; and for each calculated coincidence rate, when the coincidence rate is greater than a preset threshold, concluding that users to which two communication records corresponding to the coincidence rate belong are a same re-subscribed user.

By using the apparatus for identifying a re-subscribed user in this embodiment, a communication record of a user is used as a basis for comparison, which improves accuracy in identifying a re-subscribed user. During calculation, communication records of the user are grouped, where communication records of various groups are mutually independent. In this way, a communication number coincidence rate between original and new users can be separately calculated within each group, which effectively reduces the number of invalid comparisons and greatly improves calculation efficiency.

Figure 10:
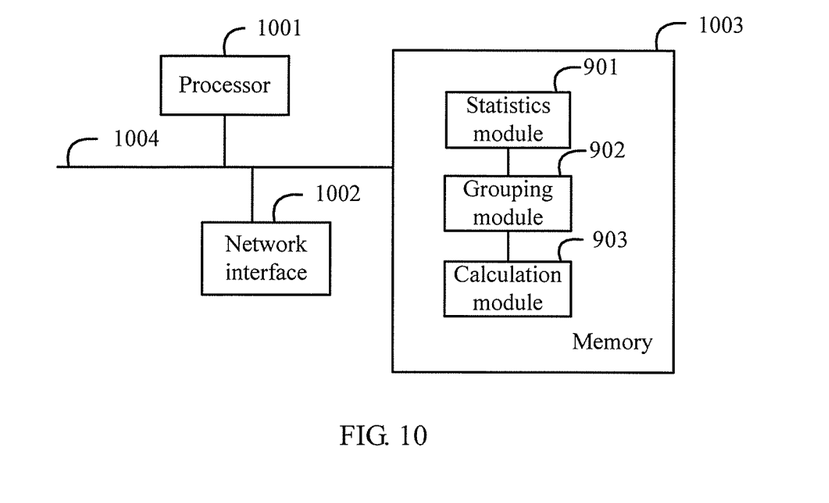
FIG. 10 is a hardware architecture diagram of an apparatus for identifying a re-subscribed user according to an embodiment of the present invention.

FIG. 10 describes a hardware architecture of an apparatus for identifying a re-subscribed user according to another embodiment of the present invention. The apparatus includes at least one processor 1001 (such as a CPU), at least one network interface 1002 or another communication interface, a memory 1003, and at least one communication bus 1004 that is configured to implement connection and communication between these apparatuses. The processor 1001 is configured to execute an executable module stored in the memory 1003, such as a computer program. The memory 1003 may include a high-speed random memory (RAM: Random Access Memory), or may also further include a non-volatile memory (non-volatile memory), for example, at least one disk memory. A communication connection between a system gateway and at least one other network element is implemented by using the at least one network interface 1002 (may be wired or wireless). The Internet, a wide area network, a local network, a metropolitan area network, and the like may be used.

In some implementations, the memory 1003 stores a program instruction. The program instruction may be executed by the processor 1001. The program instruction includes a statistics module 901, a grouping module 902, and a calculating module 903. For specific implementation of the modules, refer to corresponding modules shown in FIG. 9, and details are not described herein again.

Based on the foregoing descriptions of the embodiments, a person skilled in the art may clearly understand that the present invention may be implemented by hardware, firmware or a collection thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

What is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A method for identifying a re-subscribed user, the method comprising:

performing statistical analysis to generate a communication record for each user within a first charging period, wherein each communication record records communication numbers of an individual user within the first charging period which are sequenced according to a preset rule;

performing statistical analysis to generate a communication record for each new user who is within a second charging period but not within the first charging period, wherein each communication record records communication numbers of an individual user within the second charging period which are sequenced according to the preset rule;

collecting communication numbers in all communication records generated by means of statistical analysis to form a group number set, and for each group number in the set, searching for at least one communication record that contains the group number among all communication records generated by means of statistical analysis, so as to generate a communication record group corresponding to the group number;

for each communication record group that is generated, executing the following:

identifying each communication record in the group, using the communication record as a to-be-compared communication record, and calculating a coincidence rate between communication numbers in the to-be-compared communication record and communication numbers in each communication record that is within the communication record group and meets a preset condition, wherein the communication record meeting a preset condition belongs to a different charging period than the to-be-compared communication record, and according to the forgoing preset rule, a group number corresponding to the communication record group is ranked first among communication numbers that are contained in both the communication record meeting a preset condition and the to-be-compared communication record; and for each calculated coincidence rate, when the coincidence rate is greater than a preset threshold, concluding that users to which two communication records corresponding to the coincidence rate belong are a same re-subscribed user.

2. The method according to claim 1, wherein there is an interval of one or more charging periods between the second charging period and the first charging period.

3. The method according to claim 1, wherein performing statistical analysis to generate a communication record comprises:
   identifying a call record of the user, wherein the call record contains a user number of the user and at least one peer-end number;
   filtering out an invalid call record;
   calculating an exponent of communication between each peer-end number in an after-filtering call record and the user number; and
   identifying a peer-end number whose exponent of communication is greater than a predefined threshold and using the peer-end number as a communication number of the user, so as to generate a communication record of the user.

4. The method according to claim 2, wherein performing statistical analysis to generate a communication record comprises:
   identifying a call record of the user, wherein the call record contains a user number of the user and at least one peer-end number;
   filtering out an invalid call record;
   calculating an exponent of communication between each peer-end number in an after-filtering call record and the user number; and
   identifying a peer-end number whose exponent of communication is greater than a predefined threshold and using the peer-end number as a communication number of the user, so as to generate a communication record of the user.

5. The method according to claim 3, wherein filtering an invalid call record comprises at least one of the following:
   deleting a call record in which a length of the user number or a length of a peer-end number is not in conformity with the preset number of digits in a valid number; and
   deleting a call record in which the user number or a peer-end number is a service phone number.

6. The method according to claim 3, wherein the call record of the user further comprises: a date and duration of a call between the user number and each peer-end number.

7. An apparatus for identifying a re-subscribed user, the apparatus comprising:
   a statistics module, configured to:
      perform statistical analysis to generate a communication record for each user within a first charging period, wherein each communication record records communication numbers of an individual user within the first charging period which are sequenced according to a preset rule, and
      perform statistical analysis to generate a communication record for each new user who is within a second charging period but not within the first charging period, wherein each communication record records communication numbers of an individual user within the second charging period which are sequenced according to the preset rule;
   a grouping module, configured to collect communication numbers in all communication records generated by means of statistical analysis to form a group number set, and for each group number in the set, search for at least one communication record that contains the group number among all communication records generated by means of statistical analysis, so as to generate a communication record group corresponding to the group number; and
   a calculating module, configured to, for each communication record group generated by the grouping module, execute the following:
      identifying each communication record in the group,
      using the communication record as a to-be-compared communication record,
      calculating a coincidence rate between communication numbers in the to-be-compared communication record and communication numbers in each communication record which is within the communication record group and meets a preset condition, wherein the communication record meeting a preset condition belongs to a different charging period than the to-be-compared communication record, and according to the forgoing preset rule, a group number corresponding to the communication record group is ranked first among communication numbers that are contained in both the communication record meeting a preset condition and the to-be-compared communication record, and
      for each calculated coincidence rate, when the coincidence rate is greater than a preset threshold, concluding that users to which two communication records corresponding to the coincidence rate belong are a same re-subscribed user.

8. The apparatus according to claim 7, wherein the statistics module configured to perform statistical analysis to generate a communication record of the user is further configured to:
   identify a call record of the user, wherein the call record contains a user number of the user and at least one peer-end number;
   filter an invalid call record;
   calculate an exponent of communication between each peer-end number in an after-filtering call record and the user number; and
   identify a peer-end number whose exponent of communication is greater than a predefined threshold and using the peer-end number as a communication number of the user, so as to generate a communication record of the user.

9. The apparatus according to claim 7, wherein there is an interval of one or more charging periods between the second charging period and the first charging period.

10. The apparatus according to claim 8, wherein there is an interval of one or more charging periods between the second charging period and the first charging period.

* * * * *